G. E. INGRAHAM.
MACHINE FOR FORMING ROLLS FROM DOUGH.
APPLICATION FILED MAR. 17, 1910.
1,007,207.
Patented Oct. 31, 1911.
2 SHEETS—SHEET 1.
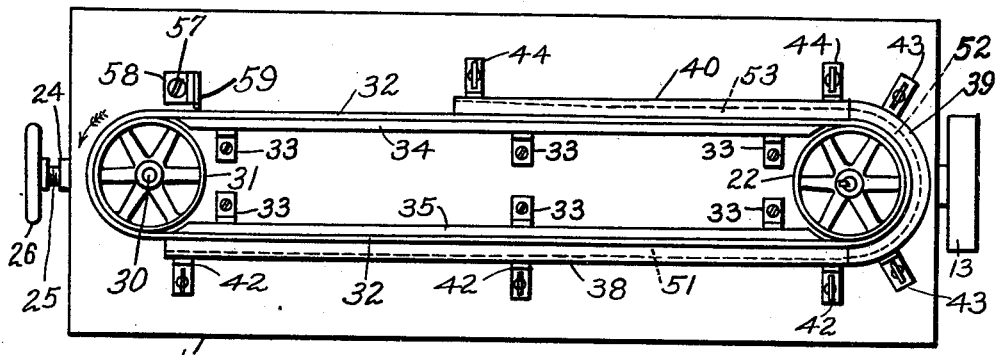
Fig. 1.
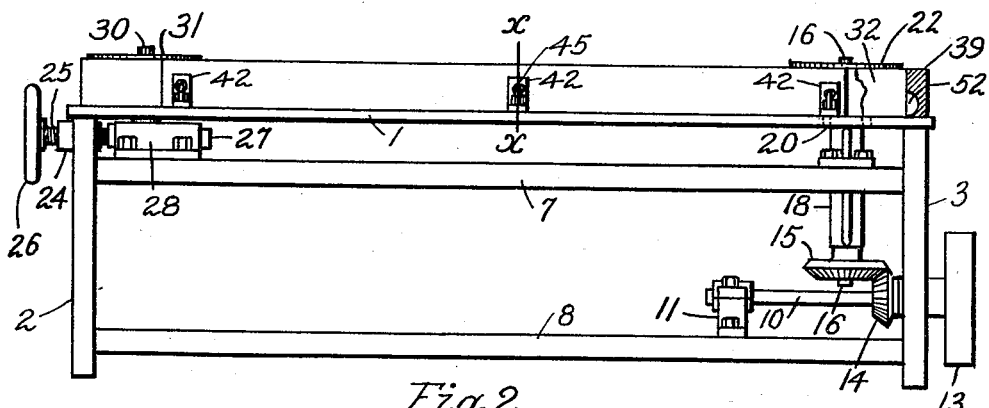
Fig. 2.
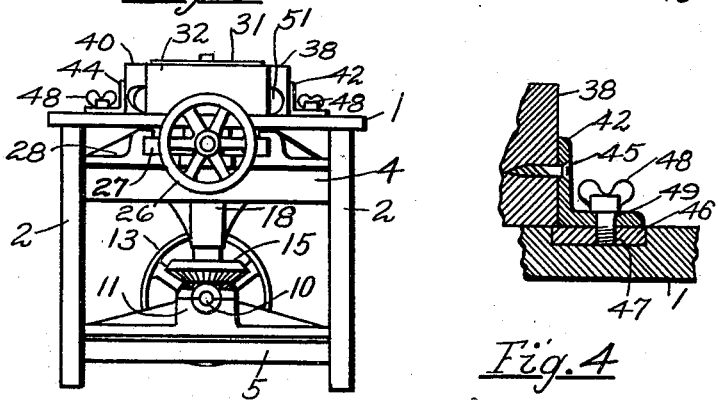
Fig. 3.
Fig. 4.
Witnesses:
Alfred H. Whatley
George H. McLaughlin
Inventor
George E. Ingraham
By Attorney
Horatio E. Bellows

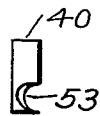 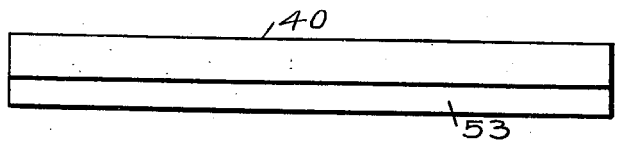 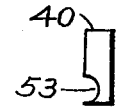
Fig. 6.  Fig. 5.  Fig. 7.
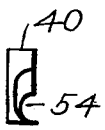 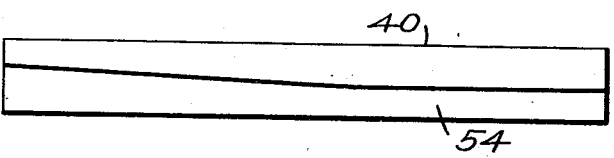 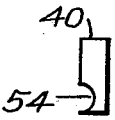
Fig. 9.  Fig. 8.  Fig. 10.
 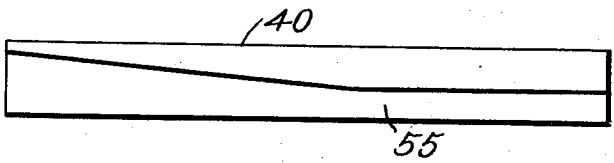 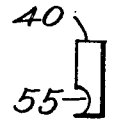
Fig. 12.  Fig. 11.  Fig. 13.

UNITED STATES PATENT OFFICE.

GEORGE E. INGRAHAM, OF BRISTOL, RHODE ISLAND.

MACHINE FOR FORMING ROLLS FROM DOUGH.

1,007,207.  Specification of Letters Patent.  Patented Oct. 31, 1911.

Application filed March 17, 1910. Serial No. 549,914.

*To all whom it may concern:*

Be it known that I, GEORGE E. INGRAHAM, a citizen of the United States, residing at Bristol, in the county of Bristol and State of Rhode Island, have invented certain new and useful Improvements in Machines for Forming Rolls from Dough, of which the following is a specification.

My invention relates to machines intended for working or shaping dough; and its essential objects are primarily to work and shape irregular pieces of dough into rolls or loaves of substantially regular contour and avoid the generation upon the dough of teats or knobs which naturally appear in the same when subjected to a rolling action in a machine; to adapt the machine to the formation of rolls of selective shapes; to prevent clogging of the mechanical parts by the dough in its travel; to increase the speed of production; to minimize the amount of flour required in "dusting", and to attain these ends in a simple, inexpensive, and easily operated mechanism.

To the above ends essentially my invention consists in the novel construction, arrangement, and mode of operation of parts set forth in and falling within the scope of the claims hereto appended.

In the accompanying drawings which form a part of this specification, Figures 1, 2 and 3 are a plan view, a side elevation, and an end view respectively of my novel machine, Fig. 4 a partial section line x—x of Fig. 2, Fig. 5 an inner side view of the delivery section of the mold board, Figs. 6 and 7, opposite end elevations of the same, Figs. 8, 9, and 10, an inner side elevation, and opposite end elevations respectively of a modified form of mold board, and Figs. 11, 12, and 13 similar elevations respectively of a second modified form of the same.

In the drawings like reference characters indicate like parts throughout the views.

The framework of my machine may be of any form of construction suitable for carrying the several details of mechanism. In the form thereof herein shown it comprises a table or board 1 supported by a frame consisting of end legs 2 and 3, end cross bars or braces 4 and 5, and longitudinal braces 7 and 8. Mounted at one end is a shaft 10 whose inner end is journaled in a bearing block 11 fixed to the brace 8 and driven by a pulley 13. Fixed to the shaft 10 is a bevel gear 14 meshing with a bevel gear 15 fixed to the lower end of a shaft 16 in a bracket 18 fixed in the brace 7, and extending through an opening 20 in the table 1 above the plane of the latter. Fixed to the shaft 16 above the table is a horizontal pulley 22. Mounted in an internally threaded sleeve 24 fixed in the brace 4 is a threaded rod or spindle 25 having a hand wheel 26 fixed to its outer end. The inner end of the spindle is fixed to a sleeve or block 27 slidable in a guide 28 fixed to the brace 7. Fixed to the block or slide 27 is a shaft 30 on which is rotatably mounted a pulley 31 connected by a belt 32 with the pulley 22 by which the idle pulley 31 is driven. The inner face of the belt 32 is preferably of leather and the outer portion of canvas. The pulley 22 is driven through the gears from the shaft 10. The pulley 31 is adjustable relatively to the pulley 22 by the wheel 26 through the spindle 25 and slide 27. Fixed to the upper surface of the table 1 by braces or angle irons 33 are upright longitudinally disposed guide strips 34 and 35 in contact with the belt 32. Coöperating with the belt is a sectional molding board comprising a long straight portion or section 38 extending longitudinally of the table, and a semicircular end section or portion 39 surrounding the pulley 22, and a section 40 shorter than the section 38 and parallel therewith, forming a continuation of section 39. These three sections are respectively fixed in an upright position with their inner faces in contact with the belt by means of the angle irons or brackets 42, 43, and 44 fixed to the outer faces of the sections by screws 45 or otherwise. The horizontal arms of all the brackets, as shown in Fig. 4, rest upon plates 46 fixed in the top of the table 1, each having threaded perforations 47 adapted to receive a thumb screw 48 passing through an opening 49 in the bracket arm. The inner face of the section 38 has a substantially semicircular groove 51; and the corresponding face of the section 39 has a like groove 52 forming a continuation of the first mentioned groove. A portion of the section 39 is in Fig. 2 shown broken away to better indicate the groove 52. The groove 53 upon the inner face of section 40 is substantially semicircular in cross section at the end adjacent the section 39, as shown in Fig. 7, but gradually changes its contour toward its opposite end, assuming at that point a somewhat flattened upper portion and an inclined lower portion, as shown in Fig. 6. The channel or groove 54 shown in Figs. 8, 9, and 10 tapers from the semicircular form shown in Fig. 10 at its receiving end to the elliptical form at its other end shown in Fig. 9.

In the third form of delivery section the groove or channel 55 has at its receiving end the semicircular cross sectional outline of Fig. 13 which develops into the elongated arcuate form shown in Fig. 12.

Fixed to the top of the table 1 by a screw 57 or otherwise is a vertical plate 58 with a lateral knife edge 59 adapted to contact with the belt 32 and act thereon as a scraper.

The operation of my machine is as follows. The pieces of dough cut into pieces of the desired size are introduced into the opening 53 at the end of the section 38 where it is impelled and rolled by the belt 32 through the sections 39 and 40. When the dough leaves the section 39 it is excessively oblong and has upon its ends knobs or bunches caused by the rolling action which would render the same unsuited for use. The flattened upper contour of the opening 53 in the delivery section coöperating with the belt 32 gives the desired final rounded contour. When, however, a squared roll of large type is desired the section shown in Fig. 8 is employed. The larger size Vienna rolls are formed by the opening in 55. It will be observed that in the section shown in Fig. 11 the top of the opening is hardly perceptibly flattened because this type of roll being of large size the dough does not develop the pronounced knobs which develop upon the small rolls and which the channel 53 is designed to correct.

It will be noted that all the mold or trough sections are removable from the table by virtue of the thumb screws 48, thus preventing the necessity of dismantling the machine to accommodate rolls of different sizes and shapes. Further that the scraper 59 prevents the injury to the rolls and to the operative parts by the accumulation of dough upon the belt.

What I claim is,—

1. In a machine of the described type, the combination with a belt and means for driving the same, of a molding board partially surrounding the belt upon one side and in contact therewith and comprising two straight parallel portions and a curved intermediate portion, said board being provided with a channel extending throughout the length of the board on the vertical face thereof adjacent said belt, a table, upright longitudinally disposed guide strips secured to the upper surface of the table for contact with the inner face of the belt and a scraper acting on said belt intermediate the ends of the board.

2. In a machine of the described type, the combination with a belt and means for driving the same, of a molding board partially surrounding the belt upon one side and in contact therewith and comprising two straight parallel portions and a curved intermediate portion, said board being provided with a channel extending throughout the length of the board on the vertical face thereof adjacent said belt, a table, and upright longitudinally disposed guide strips secured to the upper surface of the table for contact with the inner face of the belt, and a scraper acting on said belt intermediate the ends of the board, the said board being provided with a continuous channel adjacent the belt, the channel being of different cross sectional contours in two straight portions of the board.

3. In a machine of the described type, the combination with an endless belt, and means for driving the same, of a molding board upon one side of the belt in contact throughout its length with said belt and comprising two straight parallel portions and a curved intermediate portion, a scraper acting on said belt intermediate the ends of the board, said board being provided with a continuous channel adjacent the belt, the channel being of different cross sectional contours in two straight portions of the board, means for giving the desired final rounded contour to the dough, and guide strips upon the opposite sides of the belt.

4. In a machine of the class described, the combination of an endless belt and means for driving the same, of a table below the belt, a molding board upon the table partially surrounding the belt and in contact throughout its length with said belt, said board comprising a main section including a curved portion, and a delivery section, the main section comprising a channel substantially semi-circular in cross section, and the delivery section comprising a channel continuous with the first-mentioned channel, longitudinally disposed upright guide strips attached to the table, the channel of the delivery section having a flattened cross sectional contour, both channels being covered by the belt, said board forming means for giving the desired final rounded contour to the dough, means upon both sections for attaching the sections to the table, and a scraper acting on said belt intermediate the ends of the board.

5. In a machine of the described class the combination with a belt, and means for driving the same, of a molding board extending partially along the belt and in contact with the same, said board being provided with a continuous molding channel, adjacent the belt, guide strips upon the opposite sides a table upon which the board is mounted, and a scraper fixed to the table intermediate the ends of the board and in contact with the belt.

6. In a machine of the described class, the combination with the frame of a table upon the frame, vertical shafts rotatably mounted in the frame and extending above the table, pulleys upon the shafts above the table, means for driving one of the shafts, an endless vertically disposed belt connecting the pulleys, a vertically disposed molding board upon the table inclosing one of the pulleys, comprising a plurality of sections extending partially along the length of the belt and in contact with the belt each provided with a groove covered by the belt, guide strips upon the opposite side angle irons upon the sections, said belt being movable between the molding board and said guide strips plates in the table, thumb screws connecting the plates with the angle irons and a scraper acting on said belt intermediate the ends of the board.

7. In a machine of the class described, the combination with an endless vertically disposed belt, means for driving the same and a table below the belt, of a vertically disposed molding board upon the table in contact with the belt parallel with the travel of the belt throughout its length upon one side, around the end and partially along the opposite side, said molding board having channels of different cross sectional contour, detachable guide strips for contact with the inner face of the belt and means for detachably retaining said molding board in position and permitting of its ready removal for substitution of other boards of different character.

8. In a machine of the character described, the combination with an endless vertically disposed belt and pulleys around which it passes, of means for driving said belt, a removably supported vertically disposed molding board in contact with the belt and having upon its face adjacent the belt grooves varying in contour at different points in the molding board and adapted to be covered by said belt, whereby the dough is rolled to give the required shape and to remove all knobs or projections, removably supported guide strips for contact with the inner face of the belt.

In testimony whereof I have affixed my signature in presence of two witnesses.

GEORGE E. INGRAHAM.

Witnesses:
 HORATIO E. BELLOWS,
 WILLIAM E. TEFFT.

Copies of this patent may be obtained for five cents each, by addressing the "Commissioner of Patents, Washington, D. C."